Patented July 6, 1926.

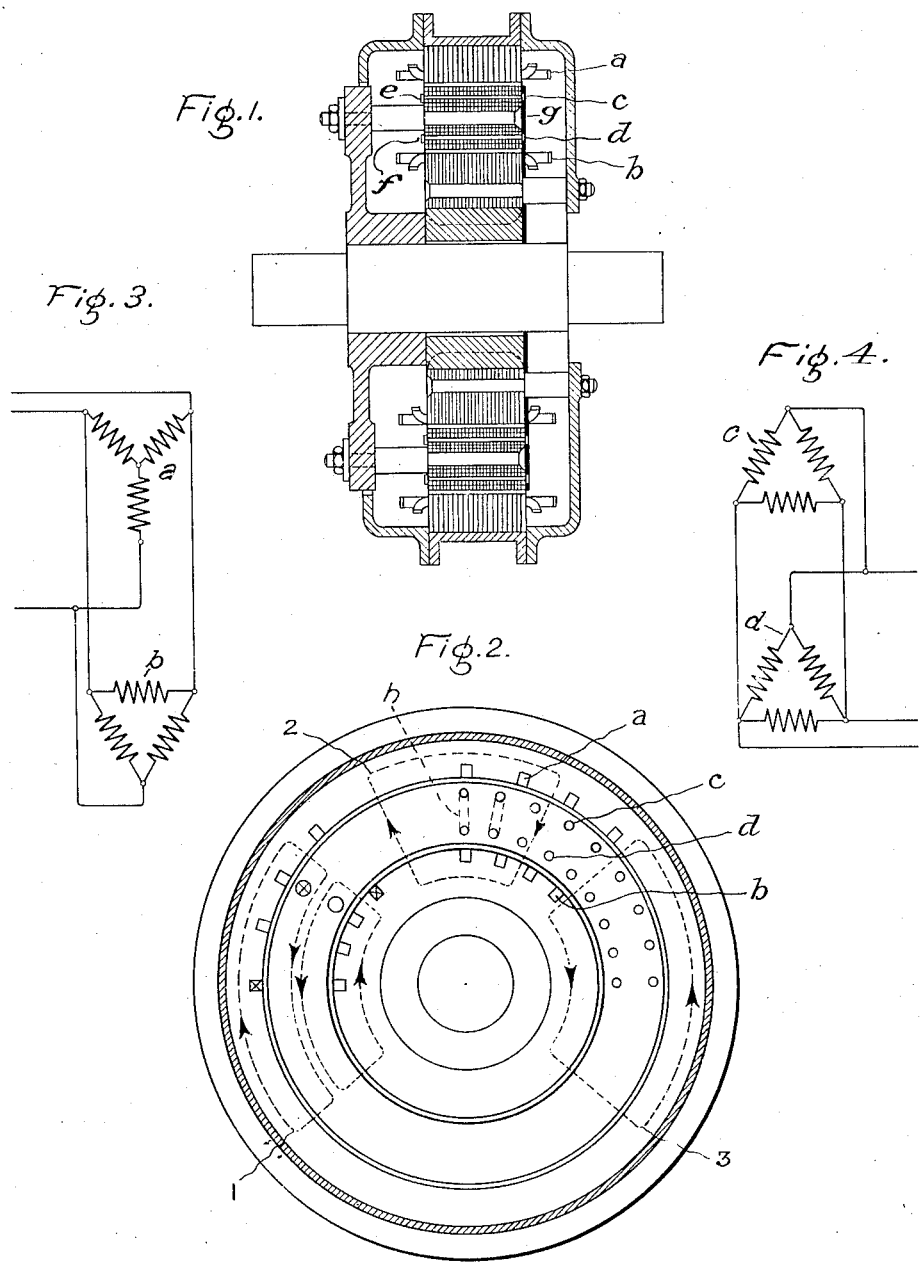

1,591,435

UNITED STATES PATENT OFFICE.

PAUL ROHDE, OF WAIDMANNSLUST, GERMANY, ASSIGNOR TO GENERAL ELECTRIC COMPANY, A CORPORATION OF NEW YORK.

POLYPHASE INDUCTION MOTOR.

Application filed April 28, 1923, Serial No. 635,355, and in Germany July 21, 1922.

My invention relates to polyphase dynamo electric machines of the induction type and particularly an improved modification of the type of induction motor described in German Patent No. 108543.

In this type of motor two stator windings are arranged side by side and cooperate with two squirrel cage windings on the same shaft. The two squirrel cage windings have a common high resistance end ring between them thru which the rotor current is caused to flow during the starting period due to a proper phase displacement of the excitation in the stator winding.

It is the object of my invention to arrange two such motor elements so that their air gaps are concentric and whereby certain desirable results, more specifically explained hereinafter, may be obtained.

The features of my invention which I believe to be novel and patentable will be pointed out in the claims appended hereto. The preferred construction and the theory of operation of my improved motor will now be described in connection with the accompanying drawings in which Fig. 1 represents a cross section thru my improved motor taken on an axial plane; Fig. 2 an incomplete end view of the motor taken inside the end shield as viewed from the right hand end of Fig. 1, and Figs. 3 and 4 diagrammatically illustrate preferred starting and running connections respectively.

Referring to Figs. 1 and 2 of the drawings, $a$ and $b$ indicate polyphase windings provided on the outer and inner stator members respectively. $c$ and $d$ indicate squirrel cage windings which cooperate with windings $a$ and $b$ respectively. The two squirrel cage windings are mounted in the same magnetic member which is relatively rotatable with respect to the stator elements and which forms a concentric cylinder between the stator elements of sufficient depth to carry the motor fluxes under all conditions. Concentric air gaps of the usual dimensions are provided between the squirrel cage member and the two stator members. The number of bars in the outer squirrel cage may be equal to or greater in number than those of the inner squirrel cage. The two squirrel cage windings are provided with individual end rings $e$ and $f$ of low resistance at one end of the motor and a common high resistance end ring $g$ at the other end. If desired, the radially adjacent bars may be provided with supplementary connections of low resistance on the high resistance end as indicated in dotted lines at $h$, since, as will be apparent, it is principally desirable to provide a high resistance path for the rotor currents which flow concentrically thru the high resistance end ring. As illustrated, the squirrel cage member is rotatable and the stator elements stationary, but it will be apparent that this condition may be reversed if desirable.

Referring to Fig. 2, the stator windings will be connected for normal running conditions so that the fluxes pass thru the squirrel cage member as indicated in dotted lines at 1. Under these conditions, little, if any, currents flow around the high resistance end ring $g$, since the current from an outer bar flows back thru the nearest adjacent inner bar. This gives a low resistance rotor and efficient running conditions.

For starting, the phase connections of the stator windings are relatively dephased so that in general their fluxes flow across both air gaps as indicated at 2 and 3. Under these conditions, the currents in radially adjacent bars flow in general in the same direction so that the larger part of these currents must flow around the high resistance end ring $g$ to the next pole before it finds a return path. Also, the induced voltages in the rotor bars are now added together geometrically rather than algebraically and the total voltage of the rotor bars is therefore smaller and the rotor current greater for a given power. For these reasons $I^2R$ loss, and with it the starting torque is increased.

It will of course be obvious that any desired sequence of connection of the two stator windings as to Y-delta, or, in groups of series-parallel in bringing the motor up to normal speed, may be employed. It will however be observed that the inner motor element will naturally be of smaller torque capacity than the outer motor element due to the difference in available space. By this I mean that for the same degree of designed efficiency as regards the utilization of iron and copper the inner motor will naturally be capable of developing less torque without injury than the outer motor when the two motor elements are similarly energized at normal voltage and frequency. This condition may be taken advantage of to obtain different torques not possible with this type of motor as heretofore designed. For example, a desirable starting connection may be obtained which is particularly advantageous for motors in sizes from 2 to 15 horse power where the Y starting connections for both stator windings would ordinarily give too small a starting torque and where the delta connection for both windings would give too large a starting torque. The starting torque for Y connections is about one-third what it would be with delta connections. If the torque capacity of the inner windings $b$ and $d$ is one-third that of the outer windings $a$ and $c$, it is feasible to connect the outer winding $a$ in Y and the inner winding $b$ in delta and obtain a starting torque of about five-ninths of the torque available with both windings connected delta. This feature which makes the additional range of torques available is of course not limited to the concentric arrangement of the motor elements.

This connection for starting is diagrammatically represented in Fig. 3 and the preferable change to running conditions is represented in Fig. 4 where the two stator windings are connected in delta so as to have the same phase relations with respect to adjacent portions of the rotor. This starting sequence makes possible a desirable starting torque with only one change in connections between running and starting.

In accordance with the patent statutes I have described the principle of operation of my invention together with what I now consider to be the preferred embodiment thereof and now seek to cover in the appended claims all modifications which come fairly within the true spirit and scope thereof.

What I claim as new and desire to secure by Letters Patent of the United States, is:

1. A dynamo electric machine comprising outer and inner stator members concentrically arranged, a relatively rotatable intermediate magnetic member carrying squirrel cage windings adjacent to and cooperating with said stator members, individual end rings for said squirrel cage windings at one end thereof, and a common end ring for said squirrel cage windings at the other end.

2. A dynamo electric machine comprising outer and inner stator members concentrically arranged, a relatively rotatable intermediate magnetic member carrying squirrel cage windings adjacent to and cooperating with said stator members, individual low resistance end rings for said squirrel cage windings at one end thereof and a common high resistance end ring for said squirrel cage windings at the other end.

3. A dynamo electric machine comprising a plurality of stator members concentrically arranged, a relatively rotatable squirrel cage winding adjacent to and cooperating with each of said stator members, individual end rings at one end of each of said squirrel cage windings and a high resistance end connection for the other ends of said squirrel cage windings.

4. A dynamo electric machine according to claim 2, characterized by the fact that said high resistance end ring is constructed to impose a greater resistance in a circumferential direction than in a radial direction.

5. A dynamo electric machine comprising two squirrel cage type induction motor elements, the squirrel cages thereof having a common high resistance end ring, separate primary windings on said motors capable of being connected in mesh or in star, and capable of being energized so as to cause the secondary currents of said motor elements to encounter the resistance of said high resistance end ring for starting purposes and to flow from one squirrel cage winding to the other without materially encountering the resistance of said high resistance end ring for running purposes, said two motors having materially different torque capacities.

6. A dynamo electric machine comprising outer and inner stator members concentrically arranged, a relatively rotatable intermediate magnetic member carrying squirrel cage windings adjacent to and cooperating with said stator members, individual low resistance end rings for said squirrel cage windings at one end thereof, and a common high resistance end ring for said squirrel cage windings at the other end, the inner induction motor element thus formed being of materially smaller torque capacity than the outer motor element.

In witness whereof, I have hereunto set my hand this 29th day of March 1923.

PAUL ROHDE.